(12) United States Patent
Saito et al.

(10) Patent No.: US 7,308,098 B2
(45) Date of Patent: Dec. 11, 2007

(54) AV COMMUNICATION CONTROL CIRCUIT FOR REALIZING COPYRIGHT PROTECTION WITH RESPECT TO RADIO LAN

(75) Inventors: Takeshi Saito, Tokyo (JP); Hiroshi Isozaki, Kawasaki (JP); Koji Kanazawa, Oume (JP); Hideaki Nakakita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 752 days.

(21) Appl. No.: 10/722,468

(22) Filed: Nov. 28, 2003

(65) Prior Publication Data

US 2004/0133780 A1    Jul. 8, 2004

(30) Foreign Application Priority Data

Nov. 29, 2002   (JP) ................... P2002-348732

(51) Int. Cl.
*H04N 7/167*   (2006.01)
(52) U.S. Cl. ........................ 380/201; 726/27
(58) Field of Classification Search ............. 380/201; 726/27
See application file for complete search history.

(56) References Cited

U.S. PATENT DOCUMENTS

| | | | | |
|---|---|---|---|---|
| 5,818,933 A | * | 10/1998 | Kambe et al. | 705/57 |
| 5,982,887 A | * | 11/1999 | Hirotani | 705/51 |
| 6,452,952 B1 | * | 9/2002 | Okuhara | 370/536 |
| 7,065,141 B2 | * | 6/2006 | Okada | 375/240.25 |
| 2003/0070181 A1 | * | 4/2003 | Holm | 725/134 |

FOREIGN PATENT DOCUMENTS

JP     2001-308775     * 11/2001

\* cited by examiner

*Primary Examiner*—Nasser Moazzami
*Assistant Examiner*—Daniel L Hoang
(74) *Attorney, Agent, or Firm*—Oblon, Spivak, McClelland, Maier & Neustadt, P.C.

(57) ABSTRACT

An AV communication control circuit suitable for a radio LAN-LSI in a radio AV transmission/reception device is formed by a copyright protection processing unit configured to carry out a copyright protection processing with respect to AV data entered from an AV stream signal line, a selection unit configured to select either one of AV data entered from an AV stream signal line and AV data entered from a general purpose bus, and a transmission control unit configured to carry out control for transmitting AV data selected by the selection unit to a network.

8 Claims, 6 Drawing Sheets

AV COMMUNICATION CONTROL CIRCUIT FOR REALIZING COPYRIGHT PROTECTION WITH RESPECT TO RADIO LAN

BACKGROUND OF THE INVENTION

1. Field of the Invention

The present invention relates to an AV communication control circuit and an AV communication control program for transmitting or receiving AV data while realizing the copyright protection.

2. Description of the Related Art

The products called digital information home electronics are becoming popular. These products are expected to become even more popular in conjunction with the start of the digital broadcasting, and include all kinds of products for handling digital data and digital contents such as digital broadcasting compatible TV, set-top box, digital VTR, DVD player, hard disk recorder, etc.

The quality of the digital data and digital contents will not be degraded even when they are copied, and the copies can be made easily, so that there is a need to provide a measure for the copyright protection in advance. For example, in the IEEE 1394 which is a digital network for connecting digital AV devices, the authentication and key exchange mechanism and the data encryption function are provided.

Here, consider a case of transferring the AV data that requires the copyright protection, from some transmission device. What needs to be taken into consideration here is that the copyright protection presupposes to allow the exchange of the AV data within a range of personal (or family) entertainment, but to prevent the exchange of the AV data with a third person (unless the permission from the copyright holder is given).

Usually, the exchange of data with a third person is carried out through a public network such as the Internet, and the exchange of data inside the home or the personal exchange of data is carried out on a closed home network such as the IEEE 1394 or a radio network.

The IEEE 1394 is a representative digital network for connecting digital AV devices, and provided with the authentication and key exchange mechanism and the data encryption function. This mechanism is called DTCP (Digital Transmission Control Protection) (see documents disclosed at "http://www.dtla.com", for example). Basically, the DTCP encryption and the authentication and key exchange mechanism are provided inside an LSI of the IEEE 1394, and it is often provided with a mechanism for encrypting the AV data immediately before transmitting them to the IEEE 1394, and decrypting them immediately after receiving them, in the case of transmitting/receiving AV data to be protected through the IEEE 1394 (see Japanese Patent Application Laid Open No. 2001-308775).

What is likely to attract attentions in near future is the home radio LAN. The IEEE 802.11 standard which is one of the radio LAN standards is rapidly spreading to offices/homes, and it is highly likely to carry out the exchange of the AV data that require the protection on the radio LAN in near future.

Even in this type of the radio LAN, there is a need to consider the copyright protection mechanism, and such a mechanism will most likely be incorporated in an LSI of the radio LAN, in view of the past experience of the IEEE 1394.

However, the known radio LAN has been basically targeting a PC network. The radio LAN interface in the PC (interface between a CPU of the PC and the radio LAN) is provided through a general purpose bus such as PCI bus, and for this reason, the integrated circuit of the radio LAN often has a PCI bus interface.

On the other hand, in near future, it is highly likely that the radio LAN is implemented on the so called AV devices such as TV, DVD, etc. An interface between an AV processing unit (such as AV decoder) and a network in these AV devices is in general an interface for directly exchanging AV stream data, for various reasons such as securing the synchronization. Thus the integrated circuit of the radio LAN should preferably have this AV stream interface, Also, the implementation of the copyright protection function is indispensable.

However, when the copyright protection function is provided inside the integrated circuit of the radio LAN, the AV data to be inputted/outputted to/from the integrated circuit of the radio LAN have to be non-encrypted raw data, and this implies that the raw data will flow through the general purpose bus such as PCI bus. In the general PC, it is relatively easy to produce a program for storing data on the general purpose bus into a specific region, so that the allowing the raw AV data to flow through the general purpose bus is problematic.

BRIEF SUMMARY OF THE INVENTION

It is therefore an object of the present invention to provide an AV communication control circuit and an AV communication control program capable of efficiently carrying out AV data processing and copyright protection processing according to a type of a device on which it is implemented and an interface specification.

According to one aspect of the present invention there is provided an AV communication control circuit, comprising: a copyright protection processing unit configured to carry out a copyright protection processing with respect to AV data entered from an AV stream signal line; a selection unit configured to select either one of AV data entered from an AV stream signal line and AV data entered from a general purpose bus; and a transmission control unit configured to carry out control for transmitting AV data selected by the selection unit to a network.

According to another aspect of the present invention there is provided an AV communication control circuit, comprising: a reception control unit configured to carry out control for receiving AV data through a network; a selection unit configured to select a target to supply received AV data as either one of an AV stream internal signal line and a general purpose internal bus; and a copyright protection processing unit configured to carry out a copyright protection processing with respect to AV data supplied to the AV stream internal signal line when the selection unit selects the AV stream internal signal line.

According to another aspect of the present invention there is provided a computer program product for causing a computer to function as an AV communication control circuit, the computer program product comprising: a first computer program code for causing the computer to carry out a copyright protection processing with respect to AV data entered from an AV stream signal line; a second computer program code for causing the computer to select either one of AV data entered from an AV stream signal line and AV data entered from a general purpose bus; and a third computer program code for causing the computer to carry out control for transmitting AV data selected by the selection unit to a network.

According to another aspect of the present invention there is provided a computer program product for causing a computer to function as an AV communication control circuit, the computer program product comprising: a first computer program code for causing the computer to carry out control for receiving AV data through a network; a second computer program code for causing the computer to select a target to supply received AV data as either one of an AV stream internal signal line and a general purpose internal bus; and a third computer program code for causing the computer to carry out a copyright protection processing with respect to AV data supplied to the AV stream internal signal line when the selection unit selects the AV stream internal signal line.

Other features and advantages of the present invention will become apparent from the following description taken in conjunction with the accompanying drawings.

DETAILED DESCRIPTION OF THE INVENTION

Referring now to FIG. 1 to FIG. 12, embodiments of the AV communication control circuit and the AV communication control program according to the present invention will be described in detail.

Figure 1:
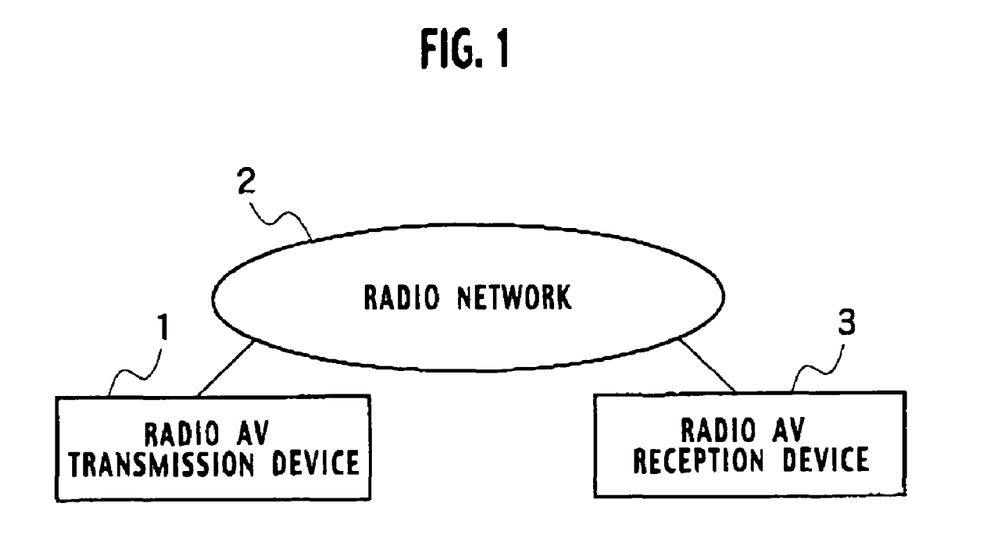
FIG. 1 is a block diagram showing an overall configuration of an AV communication system according to one embodiment of the present invention.

FIG. 1 shows an overall configuration of an AV communication system according to one embodiment of the present invention. The AV communication system of FIG. 1 has a radio AV transmission device 1 for transmitting AV data by radio, and a radio AV reception device 3 for receiving the AV data from the radio AV transmission device 1 through a radio network 2.

The radio network 2 of FIG. 1 is assumed to be a network inside the home, but it is not necessarily a radio network, and can be a wired network such as the Ethernet or a mixed network in which a radio network and a wired network are connected by bridge. Here, the radio network 2 is a radio LAN such as that of the IEEE 802.11a or the IEEE 802.11b, for example.

The radio AV transmission device 1 is a device capable of becoming a source device of the AV data such as TV, set-top box, DVD player, etc. The general TV or set-top box does not have a large data buffer between an MPEG processing unit and a radio LAN-LSI, but has an interface for directly exchanging AV streams and synchronization clocks instead.

On the other hand, the radio AV reception device 3 is a device capable of a sink device of the AV data such as a display device, speaker or audio/video recording device of the TV or the like.

Figure 2:
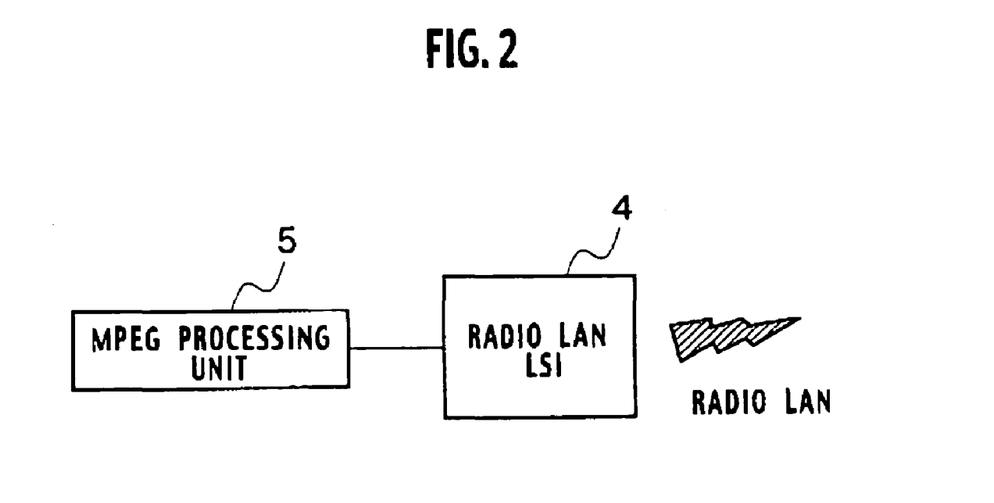
FIG. 2 is a block diagram showing one exemplary internal configuration of a radio AV transmission device in the AV communication system of FIG. 1.

FIG. 2 shows an exemplary internal configuration of the radio AV transmission device 1 or FIG. 1. This configuration is intended to be used mainly in a dedicated AV device such as DVD player. The radio AV transmission device 1 of FIG. 2 has a radio LAN-LSI 4 and an MPEG processing unit 5. For example, the MPEG processing unit 5 is formed by an MPEG encoder with a function for MPEG encoding video signals, an MPEG reception unit with a function for receiving video signals (of the TV broadcast, for example), and an MPEG storage unit with a function for storing video signals (such as hard disk or DVD, for example). Also, the MPEG processing unit 5 has a function for transmitting the digital AV data that require the copyright protection, to the radio LAN-LSI 4.

In the MPEG processing unit 5, at least one terminal for outputting MPEG date and clock is provided, and the radio LAN-LSI 4 is connected to this terminal.

The radio LAN-LSI 4 has a function for carrying-out radio LAN transmission/reception control, as well as a function for carrying out the copyright protection processing and the AV data format processing.

Figure 3:
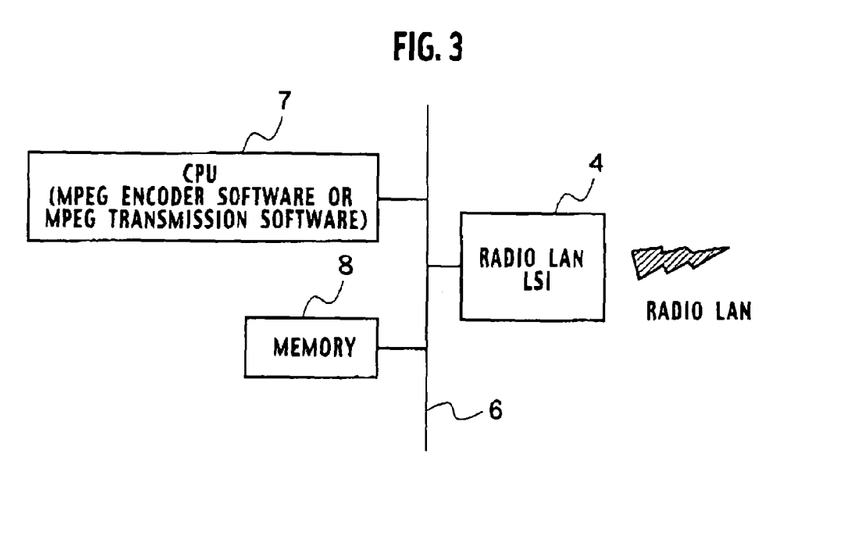
FIG. 3 is a block diagram showing another exemplary internal configuration of a radio AV transmission device in the AV communication system of FIG. 1.

FIG. 3 shows another exemplary internal configuration of the radio AV Transmission device 1 of FIG. 1. This configuration is intended to be used mainly in a PC. The radio AV transmission device 1 of FIG. 3 has a CPU 7, a memory 8 and a radio LAN-LSI 4, which are connected to a general purpose bus 6 such as PCI bus.

The CPU 7 executes the MPEG processing by software. Note that it is also possible to provide a functional block for executing the MPEG processing by hardware inside the CPU 7.

The processing power of the CPU 7 has been significantly increased over recent years, so that a configuration for carrying out the MPEG processing by software as shown in FIG. 3 is expected to become widespread rapidly.

To develop configurations of the radio LAN-LSI 4 compatible with the radio AV transmission device configurations of FIG. 2 and FIG. 3 separately is wasteful in terms of cost, so that it is preferable to have an identical radio LAN-LSI 4 utilizable in either one of the radio AV transmission device configurations of FIG. 2 and FIG. 3.

Figure 4:
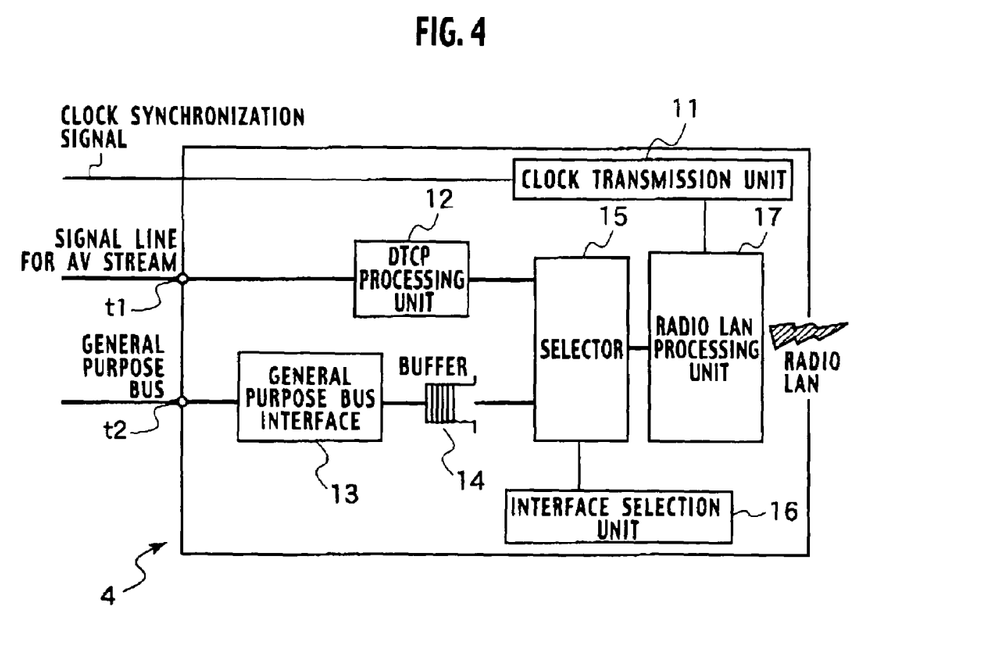
FIG. 4 is a block diagram showing an exemplary internal configuration of a radio LAN-LSI that can be utilized in either one of the radio AV transmission device configurations of FIG. 2 and FIG. 3.

FIG. 4 shows an exemplary internal configuration of the radio LAN-LSI 4 which is utilizable in either one of the radio AV transmission device configurations of FIG. 2 and FIG. 3. The radio LAN-LSI 4 of FIG. 4 has a clock transmission unit 11, a DTCP processing unit 12, a general purpose bus interface 13, a buffer 14, a selector 15, an interface selection unit 16, and a radio LAN processing unit 17.

The clock transmission unit 11 outputs the synchronization clock for the AV data entered from an external, to the radio LAN side through the radio LAN processing unit 17. The DTCP processing unit 12 carries out the DTCP copyrights protection processing with respect to the AV data supplied from the MPEG processing unit 5 of FIG. 2 through an AV stream signal line, The buffer 14 temporarily stores the AV data supplied from the CPU 7 of FIG. 3 through the general purpose bus 6 and the general purpose bus interface 13.

The selector 15 selects either one of the AV data for which the copyright protection processing is carried out by the DTCP processing unit 12 and the AV data supplied from the general purpose bus without carrying out the copyright protection processing. The selection at the selector 15 is made by the interface selection unit 16. The AV data selected at the selector 15 are modulated at the radio LAN processing unit 17 and then transmitted to the radio network 2.

The reason for carrying our the copyright protection processing at the DTCP processing unit 12 with respect to the AV data supplied through the AV stream signal line is that, in the case of the radio AV transmission device configuration of FIG. 2, the AV stream signal line between the MPEG processing unit 5 and the radio LAN-LSI 4 is not connected with anywhere else so that there is no need to carry out the copyright protection processing with respect to the AV data on this AV stream signal line, and therefore the copyright protection processing is carried out after the AV data are entered into the radio LAN-LSI 4.

On the other hand, in the case of the radio AV transmission device configuration of FIG. 3, the AV data are exchanged through the general purpose bus 6 so that if the copyright protection processing is to be carried out inside the radio LAN-LSI 4, non-encrypted raw AV data would flow through the general purpose bus 6 and there is a possibility of having the AV data illegally acquired by an AV capture device or the like that is connected to the general purpose bus 6. For this reason, in the case of the radio AV transmission device configuration of FIG. 3, the copyright protection processing is carried out by software at the CPU 7 side, and the encrypted AV data are supplied to the general purpose bus 6. Consequently, there is no need to carry out the copyright protection processing inside the radio LAN-LSI 4.

The radio LAN-LSI 4 of FIG. 4 has an external connection terminal t1 to be connected to the AV stream signal line, and an external connection terminal t2 to be connected to the general purpose bus. The radio LAN-LSI 4 in practice has many other terminals as well, so that it is preferable to reduce the number of terminals as much as possible.

Figure 5:
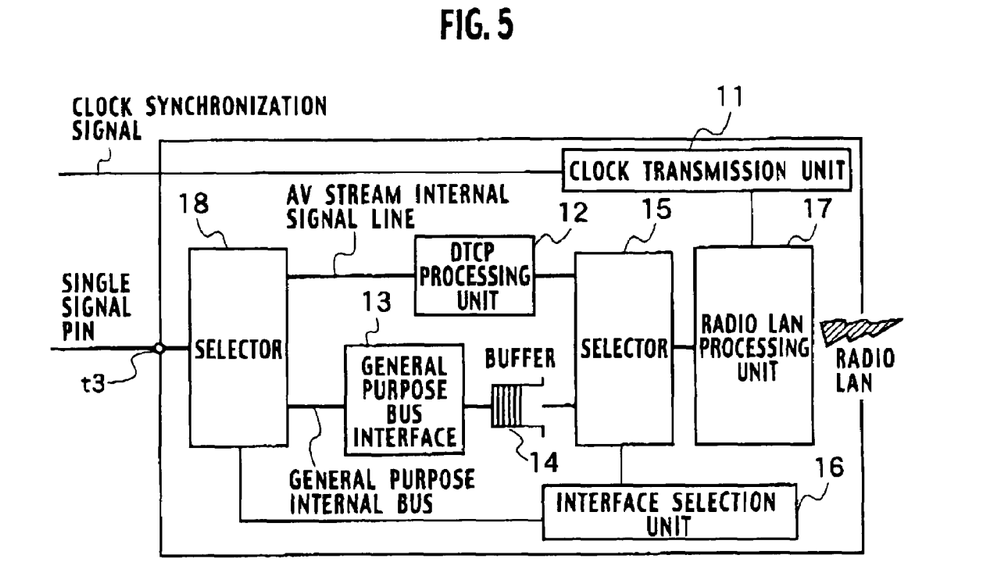
FIG. 5 is a block diagram showing an exemplary internal configuration of a radio LAN-LSI with a single AV data input terminal that can be utilized in either one of the radio AV transmission device configurations of FIG. 2 and FIG. 3.

For this reason, FIG. 5 shows an exemplary internal configuration of the radio LAN-LSI 4 which has a single AV data input terminal. In FIG. 5, the constituent elements identical to those of FIG. 4 are given the same reference numerals, and the difference will be mainly described in the following.

The radio LAN-LSI 4 of FIG. 5 has a single external connection terminal t3 which is capable of being connected to either one of the AV stream signal line and the general purpose bus, and a selector 18 connected to this external connection terminal t3. This selector 18 selects a target for supplying the AV data entered at the external connection terminal t3 as either an AV stream internal signal line or a general purpose internal bus, and the selection is made by the interface selection unit 16, similarly as in the case of the selector 15. The interface selection unit 16 makes the selections at the selectors 15 and 18 in synchronization with each other.

Figure 6:
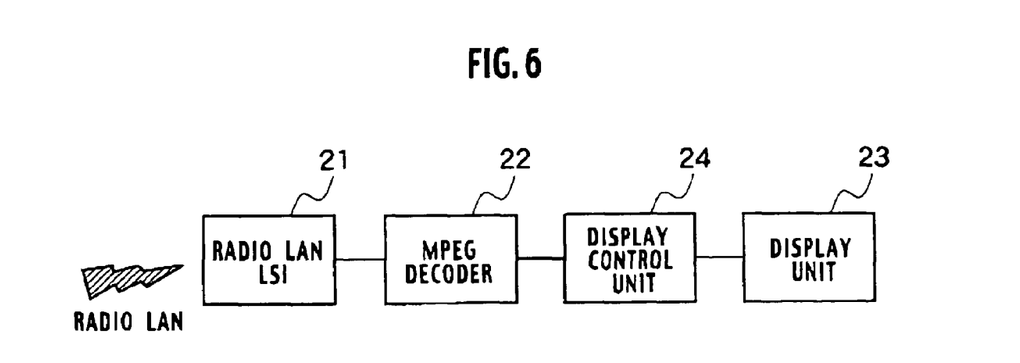
FIG. 6 is a block diagram showing one exemplary internal configuration of a radio AV reception device in the AV communication system or FIG. 1.

FIG. 6 shows an exemplary internal configuration of the radio AV reception device 3 of FIG. 1. This configuration is intended to be used mainly in a dedicated AV device such as TV The radio AV reception device 3 of FIG. 6 has a radio LAN-LSI 21, an MPEG decoder 22 for decoding the received AV data in the MPEG format, and a display control unit 24 for carrying out control to display the received AV data on a display unit 23.

The radio LAN-LSI 21 carries out the radio LAN transmission/reception control, the copyright protection processing, and the AV data format processing.

Figure 7:
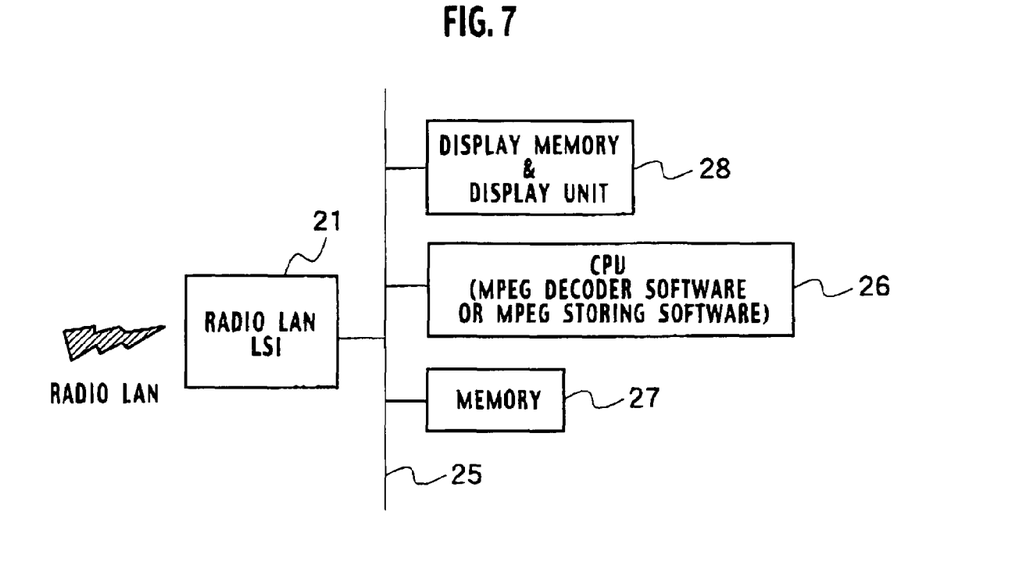
FIG. 7 is a block diagram showing another exemplary internal configuration of a radio AV reception device in the AV communication system of FIG. 1.

FIG. 7 shows another exemplary internal configuration of the radio AV reception device 3 of FIG. 1. This configuration is intended to be used mainly in a PC. The radio AV reception device 3 of FIG. 7 has a CPU 26, a memory 27, a display memory and display unit 28, and a radio LAN-LSI 21, which are connected to a general purpose bus 25 such as PCI bus.

The CPU 26 executes the decoding processing of the AV data in the MPEG format and the processing for storing into the memory 27 by software.

Figure 8:
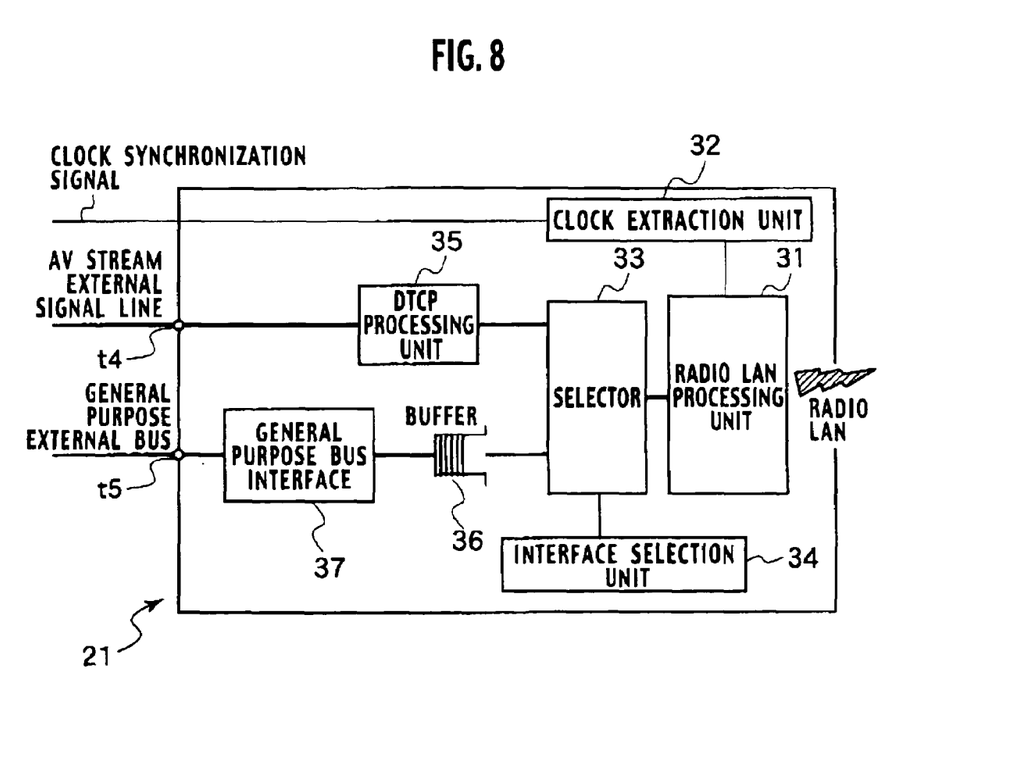
FIG. 8 is a block diagram showing an exemplary internal configuration of a radio LAN-LSI that can be utilized in either one of the radio AV reception device configurations of FIG. 6 and FIG. 7.

FIG. 8 shows an exemplary internal configuration of the radio LAN-LSI 21 which is utilizable in either one of the radio AV reception device configurations of FIG. 6 and FIG. 7. The radio LAN-LSI 21 of FIG. 8 has a radio LAN processing unit 31, a clock extraction unit 32, a selector 33, an Interface selection unit 34, a DTCP processing unit 35, a buffer 36, and a general purpose bus interface 37.

The radio LAN processing unit 31 receives radio signals containing the AV data through the radio network 2. The clock extraction unit 32 extracts clock synchronized with the AV data from the received radio signals or the received AV data.

The selector 33 selects a target for supplying the AV data contained in the received radio signals as either an AV stream signal line or a general purpose bus. The AV data for the AV stream signal line selected by the selector 33 are decrypted at the DTCP processing unit 35, and supplied to the AV stream signal line. On the other hand, the AV data for the general purpose bus selected by the selector 33 are temporarily stored in the buffer 36 and then supplied to the general purpose bus through the general purpose bus interface 37.

The AV data supplied to the AV stream signal line from the radio LAN-LSI 21 of FIG. 8 are entered into the MPEG decoder 22 of FIG. 6 and decoded there. Also, the AV data supplied to the general purpose bus from the radio LAN-LSI 21 of FIG. 8 are entered into the CPU 26 of FIG. 7 and decoded there by software.

Figure 9:
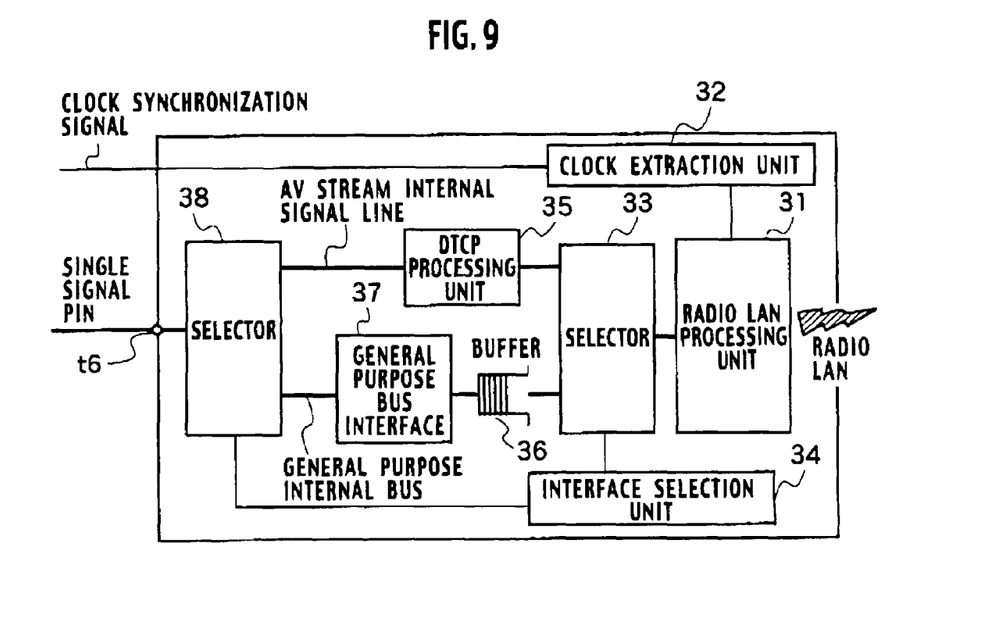
FIG. 9 is a block diagram showing an exemplary internal configuration of a radio LAN-LSI with a single external connection terminal that can be utilized in either one of the radio AV reception device configurations of FIG. 6 and FIG. 7.

The radio LAN-LSI 21 of FIG. 8 has an external connection terminal t4 to be connected to the AV stream signal line, and an external connection terminal t5 to be connected to the general purpose bus. FIG. 9 shows an exemplary internal configuration of the radio LAN-LSI 21 which has a single external connection terminal. In FIG. 9, the constituent elements identical to those of FIG. 8 are given the same reference numerals, and the difference will be mainly described in the following.

The radio LAN-LSI 21 of FIG. 9 has a single external connection terminal t6 which is capable of being connected to either one of the AV stream signal line and the general purpose bus, and a selector 38 connected to this external connection terminal t6. This selector 38 selects either one of the AV data outputted from the DTCP processing unit 35 and the AV data outputted from the general purpose bus interface unit 37, and supplies the selected AV data to the external connection terminal t6. The selection is made by the interface selection unit 34, similarly as in the case of the selector 33. The interface selection unit 34 makes the selections at the selectors 33 and 38 in synchronization with each other.

Figure 10:
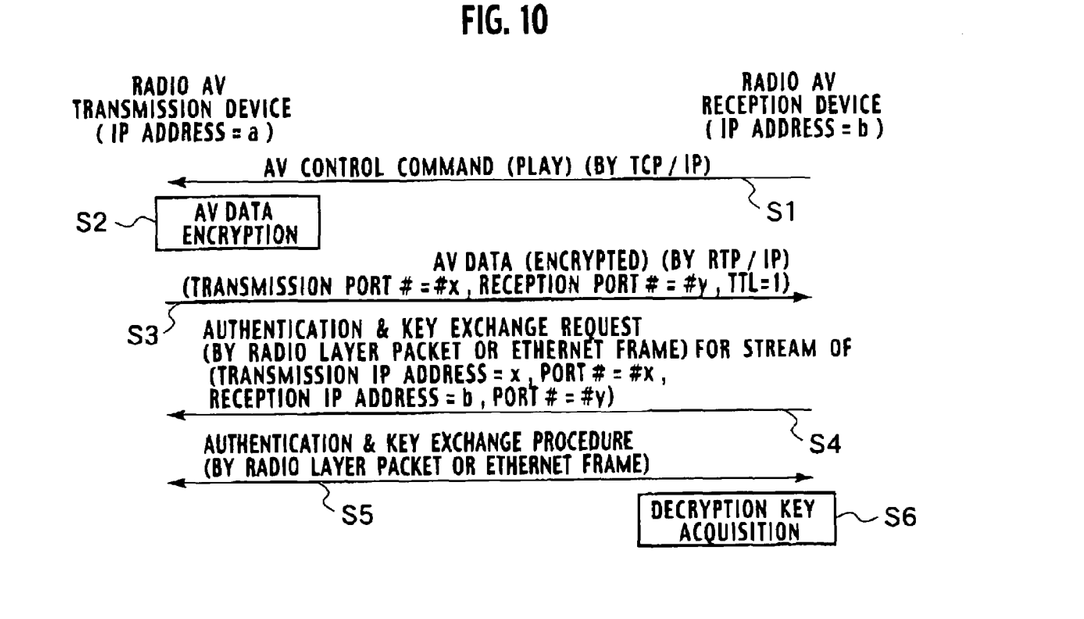
FIG. 10 is a sequence chart showing an AV data transmission/reception sequence in the AV communication system of FIG. 1.

FIG. 10 shows a AV data transmission/reception sequence In the AV communication system of FIG. 1. First, the AV control command for requesting a playback of the AV data is transmitted, by TCP/IP or UDP/IP for example, from the radio AV reception device 3 to the radio AV transmission device 1 (step S1).

Upon receiving this request, the radio AV transmission device 1 encrypts the AV data (step S2). Next, the radio AV transmission device 1 transmits the AV data, by RTP/IP for example, to the radio AV reception device 3 (step S3). At this point, in the case of the AV data that require the copyright protection, the DTCP encryption is carried out and the AV data are transmitted with the transmission port number=#x, the reception port number=#y, and TTL (Time To Live)=1.

The radio AV reception device 3 that received the encrypted AV data recognizes that they are encrypted when the AV data are received. Then, the radio AV reception device 3 assigns specific IP address and port number (or the number that can identify an RTF connection such as SSRC) and requests the authentication and key exchange for that RTP connection.

When the radio AV transmission device 1 responds to this request, the authentication and key exchange procedure is carried out by using the radio layer packet or the Ethernet frame, between the radio AV transmission device 1 and the radio AV reception device 3 (step S5). As a result, the radio AV reception device 3 acquires a decryption key (step S6), and decrypts the AV data by using this decryption key.

In this way, in this embodiment, the radio LAN-LSI 4 which carries out the radio transmission of the AV data supplied through the AV stream after carrying out the copyright protection processing, and carries out the radio transmission of the AV data supplied through the general purpose bus without any change is provided inside the radio AV transmission device 1, so that the identical radio LAN-LSI 4 can be utilized in either one of the radio AV transmission device 1 having the AV stream signal line and the radio AV transmission device 1 having the general purpose bus, and there is no need to develop the compatible LSIs separately for them so that the LSI development cost can be reduced.

Also, in this embodiment, the radio LAN-LSI 21 which transmits the AV data after carrying Out the copyright protection processing in the case of transmitting the AV data contained in the received radio signals to the AV stream signal line, and transmits the AV data without carrying out the copyright protection processing in the case of transmitting the AV data to the general purpose bus is provided inside the radio AV reception device 3, so that the identical radio LAN-LSI 21 can be utilized in either one of the radio AV reception device having the AV stream signal line and the radio AV reception device 3 having the general purpose bus, and there is no need to develop the compatible LSIs separately for them so that the LSI development cost can be reduced.

Figure 11:
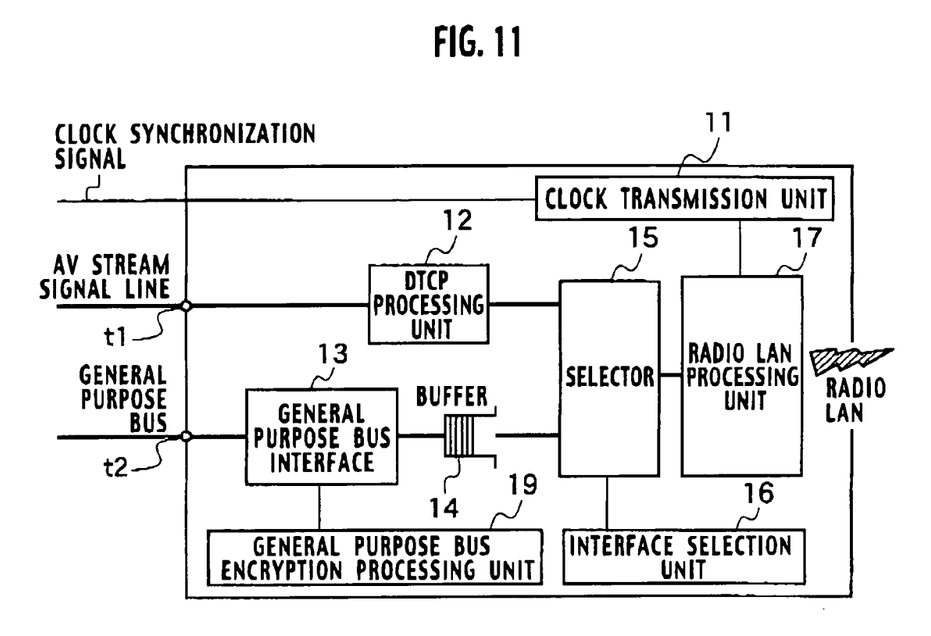
FIG. 11 is a block diagram showing an exemplary internal configuration of a radio LAN-LSI with a general purpose bus encryption processing unit that can be utilized in either one of the radio AV transmission device configurations of FIG. 2 and FIG. 3.
Figure 12:
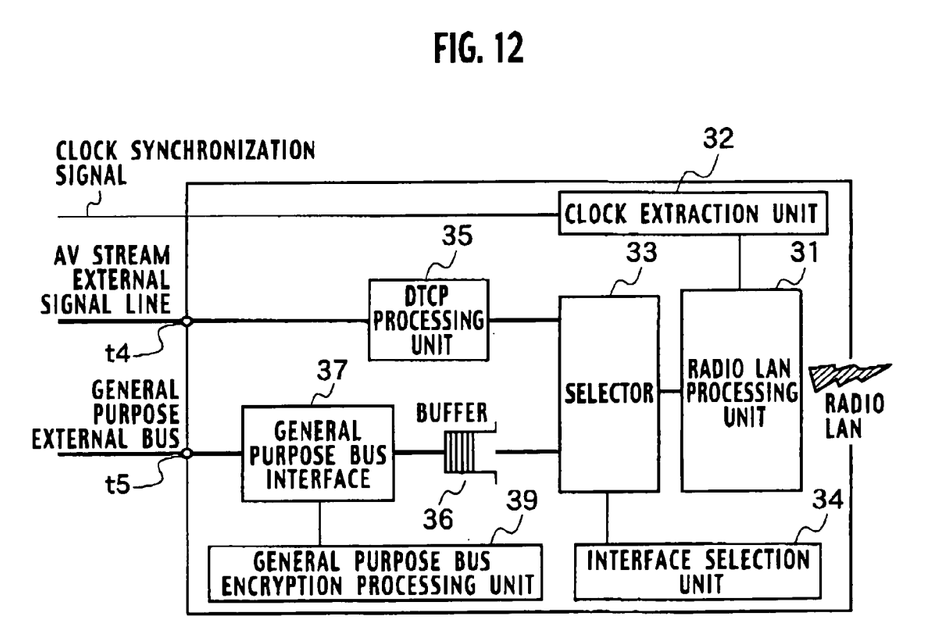
FIG. 12 is a block diagram showing an exemplary internal configuration of a radio LAN-LSI with a general purpose bus encryption processing unit that can be utilized in either one of the radio AV reception device configurations of FIG. 6 and FIG. 7.

In the above described embodiment, the exemplary case where the AV data supplied through the general purpose bus are entered into the radio LAN-LSI 4 in an encrypted state, but it is also possible to carry out the DTCP encryption processing with respect to the AV data on the general purpose bus inside the radio LAN-LSI 4, separately from the encryption on the general purpose bus. The internal configurations of the radio LAN-LSIs 4 and 21 in this case are as shown in FIG. 11 and FIG. 12, respectively. A general purpose bus encryption processing unit 19 or 39 in FIG. 11 or FIG. 12 carries out the copyright protection processing with respect to the AV data on the general purpose bus. AL this point, the authentication and key exchange will be carried out in advance with the correspondent (the MPEG software on the CPU in this embodiment) for exchanging the AV data through the general purpose bus.

The radio LAN-LSI 4 or 21 described in the above embodiments may be realized in a form of software. In that case, a program for realizing functions of the radio LAN-LSI 4 or 21 is stored in a recording medium such as floppy disk or CD-ROM, which can be read out from there and executed by a computer. The recording medium is not necessarily limited to a portable one such as a magnetic disk or an optical disk, and can be a fixed one such as a hard disk device or a memory device.

It is also possible to distribute a program for realizing functions of the radio LAN-LSI 4 or 21 through communication channels (including those of the radio communications) of the Internet or the like. In addition, this program may be distributed in an encrypted, modulated or compressed state, through the wired channels of the Internet or the like or the radio channels, or this program may be distributed by storing it in a recording medium.

As described above, according to tic present invention, it is made possible to transmit/receive either one of the AV data on the AV stream signal line and the AV data on the general purpose bus, so that there is no need to prepare dedicated integrated circuits for these two cases, and it is possible to reduce the designing and manufacturing cost of the integrated circuit.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An AV communication control circuit, comprising:
a copyright protection processing unit configured to carry out a copyright protection processing with respect to AV data entered from an AV stream signal line;
a selection unit configured to select either one of AV data entered from an AV stream signal line and AV data entered from a general purpose bus;
a transmission control unit configured to carry out control for transmitting AV data selected by the selection unit to a network;
an external connection terminal connected with either one of the AV stream signal line and the general purpose bus, for receiving AV data from one of the AV stream signal line and the general purpose bus;

another selection unit configured to select a target to supply AV data received at the external connection terminal to either an AV stream internal signal line connected to the copyright protection processing unit or a general purpose internal bus connected to the selection unit; and a selection control unit configured to control selecting operations of the selection unit and the another selection unit in synchronization.

2. The AV communication control circuit of claim 1, wherein the copyright protection processing unit carries out the copyright protection processing with respect to AV data supplied through the AV stream internal signal line when the another selection unit selects the AV stream internal signal line, and the selection unit receives AV data for which the copyright protection processing has been carried out before entering the AV communication control circuit through the general purpose internal bus when the another selection unit selects the general purpose internal bus.

3. The AV communication control circuit of claim 1, further comprising:

another copyright protection processing unit configured to carry out the copyright protection processing with respect to AV data entered from the general purpose bus.

4. An AV communication control circuit, comprising:

a reception control unit configured to carry out control for receiving AV data through a network;

a selection unit configured to select a target to supply received AV data as either one of an AV stream internal signal line and a general purpose internal bus;

a copyright protection processing unit configured to carry out a copyright protection processing with respect to AV data supplied to the AV stream internal signal line when the selection unit selects the AV stream internal signal line;

an external connection terminal connected with either one of the AV stream signal line and the general purpose bus, for outputting AV data from one of the AV stream internal line and the general purpose internal bus;

another selection unit configured to select either one of AV data supplied through the AV stream internal signal line and AV data supplied through the general purpose internal bus and supply selected AV data to the external connection terminal; and a selection control unit configured to control selecting operations of the selection unit and the another selection unit in synchronization.

5. The AV communication control circuit of claim 4, wherein the another selection unit selects either one of AV data supplied through the AV stream internal signal line for which the copyright protection processing is carried out by the copyright protection processing unit and AV data supplied through the general purpose internal bus for which the copyright protection processing is not carried out.

6. The AV communication control circuit of claim 4, further comprising:

another copyright protection processing unit configured to carry out the copyright protection processing with respect to AV data supplied through the general purpose internal bus.

7. An AV communication control circuit, comprising:

a copyright protection processing unit configured to carry out a copyright protection processing with respect to AV data entered from an AV stream signal line;

a selection unit configured to select either one of AV data entered from an AV stream signal line and AV data entered from a general purpose bus;

a transmission control unit configured to carry out control for transmitting AV data selected by the selection unit to a network; and another copyright protection processing unit configured to carry out the copyright protection processing with respect to AV data entered from the general purpose bus.

8. An AV communication control circuit, comprising:

a reception control unit configured to carry out control for receiving AV data through a network;

a selection unit configured to select a target to supply received AV data as either one of an AV stream internal signal line and a general purpose internal bus;

a copyright protection processing unit configured to carry out a copyright protection processing with respect to AV data supplied to the AV stream internal signal line when the selection unit selects the AV stream internal signal line; and another copyright protection processing unit configured to carry out the copyright protection processing with respect to AV data supplied through the general purpose internal bus.

* * * * *